July 25, 1944. C. E. O'NEIL 2,354,607
PEELING AND SLICING ATTACHMENT FOR KNIVES
Filed July 5, 1943

INVENTOR
C. E. O'NEIL
BY
ATTORNEYS

Patented July 25, 1944

2,354,607

UNITED STATES PATENT OFFICE 2,354,607

PEELING AND SLICING ATTACHMENT FOR KNIVES

Charles E. O'Neil, Timmins, Ontario, Canada, assignor of twenty-five percent to International Detachable Bits & Equipment Limited, South Porcupine, Ontario, Canada, a company of Ontario, Canada Application July 5, 1943, Serial No. 493,521

6 Claims. (Cl. 30—284)

This invention relates to peeling and slicing attachments for knives.

It is an object of the invention to provide a simple form of peeling attachment which may be readily applied to a knife blade to gauge the thickness of a slice or peel and which will be firmly held in position when mounted.

A further object of the invention is to provide an attachment of this kind which may be adjusted to vary the thickness of the slice or peel.

A still further object of the invention is to provide a device of this character adjustable in respect to thickness of slice or peel and in which the attachment is locked in a given adjusted position when mounted upon the knife blade.

A still further object of the invention is to provide a peeling attachment which is made up of few parts of simple construction such that it may readily be cleaned.

A still further object of the invention is to provide a peeling attachment which may be manufactured and sold at low cost.

With these and other objects in view the invention generally comprises an attachment having a guide plate supported on clips, said clips forming a means of mounting the attachment upon the knife blade. Preferably the guide plate is slidably mountable on the clips, the clips being formed from a piece of material bent upon itself to form jaws, the sliding guide plate being clamped in adjusted position on the clips automatically when the latter are placed in position straddling the knife blade.

The invention will be more clearly understood by reference to the following specification taken in conjunction with the accompanying drawing.

Figure 1:
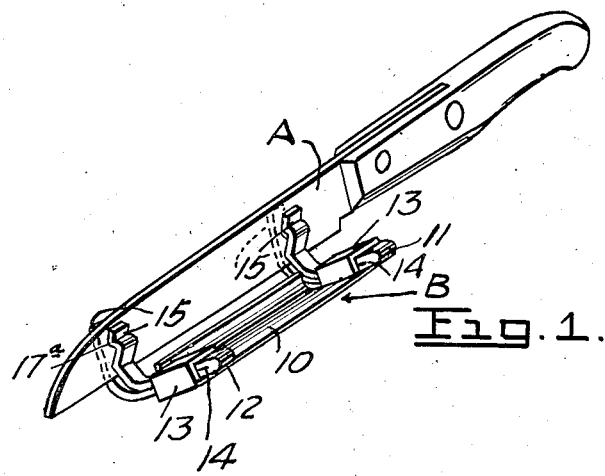
Fig. 1 is a perspective view of the peeling attachment of the present invention mounted on a knife blade.
Figure 2:
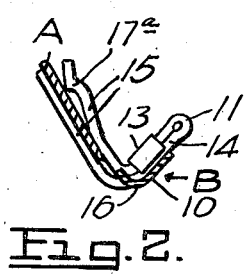
Fig. 2 is a transverse section taken through the peeling attachment mounted on the knife blade, the guide plate therefor being located in its lowermost position for the finest peeling operation.
Figure 3:
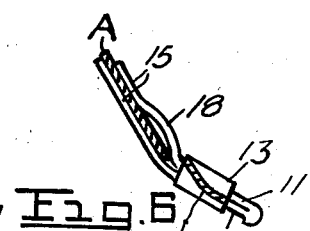
Fig. 3 is a view similar to Fig. 2 but illustrating the knife and peeling attachment as it operates in peeling the skins of fruit or vegetables.

Referring to the drawing, A indicates any suitable knife blade and B generally indicates a slicing attachment according to the present invention which comprises a guide plate 10 carried on two mounting clips 11 and 12. Preferably, the guide plate is formed with integral sleeve-like portions 13 at each end which are designed to slide upon the shank portions 14 of the clips 11 and 12 so that the guide plate 10 may be adjusted along the shank portion of these clips.

Figure 7:
Fig. 7 is a transverse section taken through one of the clips to show how the knife blade between the jaws thereof forces apart the clip to clamp the mounting sleeve of the guide plate in an adjusted position on the clips.

Upon referring to Fig. 7 in particular, it will be noted that the clips 11 and 12 are each formed from a single piece of material bent upon itself to provide two sections of material, the said sections being bent to form the shank portion 14 and the jaw portion 15. The clips are formed from a relatively spring-like material and normally when the sections thereof lie substantially in engagement with one another, the guide plate 10 may be slid so that its sleeves are disposed adjacent the bottom of the shank, adjacent the top of the shank or at a point intermediate thereof. However, when the jaws are caused to straddle a knife blade, the sections of the clip are spread apart thus clamping the sleeves of the guide plate in adjusted position and through this means, the distance the guide plate is spaced from the plane of the knife blade may be gauged.

Figure 6:
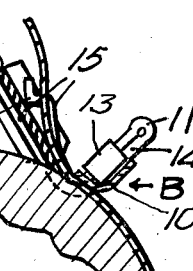
Fig. 6 is a transverse view through a knife blade and peeling attachment showing a guide plate of slightly different contour.
Figure 4:
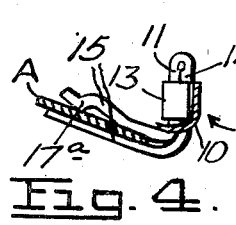
Fig. 4 is a view similar to Fig. 3 but illustrating the peeling attachment adjusted higher on the mounting clips for slicing.
Figure 5:
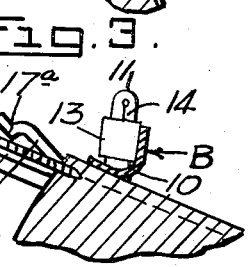
Fig. 5 is a view similar to Fig. 4 illustrating the blade and peeling or slicing attachment in position for slicing a relatively thick slice.

The guide plate preferably takes the form shown in cross section, either in Figs. 2 to 5 or in Fig. 6. In connection with the former group of figures, the guide plate 10 is offset as at 16 in curved contour whereas in Fig. 6 it is offset as at 17 directly at an angle to the remaining part of the plate. The guide plate and sleeves may be formed as one integral piece of material wherein the ends thereof are bent to form the sleeves 13 while by slitting the material transversely directly adjacent to the sleeves, the plate may be offset as described. On the other hand, it is apparent, of course, that the guide plate may be made up in any way and may employ separate sleeves which are connected therewith by brazing, welding, etc.

The clips are preferably formed so as to provide for substantial grip and one section thereof may be bent as at 17a (see Figs. 2 to 4) to provide for better clamping and more positive separation of the jaws to lock the sleeves. On the other hand, a similar effect may be had by curving one section of the jaws such as at 18 (see Fig. 6).

It is apparent that the attachment is very simple in construction and, therefore, does not require any particular effort to place it in position on the knife or to adjust it. Moreover, it will be noted that by reversing the attachment, it can be used in conjunction with the knife in a slicing operation wherein the user slices outwardly rather than slicing inwardly towards himself. Thus the attachment lends itself in practical use to the type of slicing or peeling that the operator may desire to employ, whereas the thickness of the peel or slice is readily gauged in a very simple and positive manner.

What I claim as my invention is:

1. A peeling and slicing attachment for a knife comprising a pair of clips each having a shank portion and a jaw portion, a guide plate having sleeves connected therewith at each end designed to encircle the shank portion of the clips, said jaw portions extending at an angle to the shank portions, and designed to straddle the knife blade, the lower edge of said guide plate being spaced apart vertically from the plane of the knife blade when said attachment is mounted on the latter.

2. A peeling and slicing attachment for a knife comprising a pair of clips each having a shank portion and a jaw portion, the latter being designed to straddle the knife blade and being offset from the former at an angle thereto, a guide plate having sleeves connected therewith at each end and designed to encircle the shank portions of the clips, the lower portions of said guide plate being inwardly offset in respect to the plane of the shank portion of the clips and in a direction towards the knife blade when the attachment is mounted on the latter, the lower edge of said guide plate being spaced vertically from the plane of the knife blade when mounted.

3. A peeling and slicing attachment for a knife as claimed in claim 2 in which each clip is formed from a single piece of material bent upon itself to form two sections substantially abutting one another, said sleeves being of a cross sectional area slightly greater than the cross sectional area of the shanks whereby said sleeves and attached guide plate may be moved along the length of the shanks, said sections in the jaw area forming upper and lower jaws and being spreadable one from the other when mounted on a knife blade whereby said sleeves with the connected guide plate are locked in a predetermined setting along the length of said shanks, the lower edge of said guide plate being spaced vertically to a predetermined degree from the plane of the knife blade.

4. A peeling and slicing attachment for a knife comprising a pair of clips each having a shank portion and a jaw portion extending at an angle to one another, a guide plate having sleeves connected therewith at each end designed to encircle the shank portion of the clips, said shank portions being formed with a projection adjacent their outer extremities, said sleeves being capable of movement on the shanks between the jaw portions and said projections, said clips being formed in two sections normally abutting one another and thereby forming said jaw portions, said jaw portions being spread apart when said clips are caused to straddle the knife blade spreading said sections and clamping said sleeves with their connected guide plate at a predetermined setting of the latter along the length of said shanks, the lower edge of said guide plate being spaced vertically from the plane of the knife blade when mounted thereon to a predetermined selected degree.

5. A peeling and slicing attachment for a knife as claimed in claim 2 in which each clip is formed from a single piece of material bent upon itself to form a double thickness of material in the shank portions and jaw portions, said double thickness forming jaws in the jaw portion of the clips.

6. A peeling and slicing attachment for a knife as claimed in claim 2 in which each clip is formed from a single piece of material bent upon itself to form a double thickness of material in the shank portions and jaw portions, said double thickness forming jaws in the jaw portion of the clips, at least one of the said jaws of each clip having an offset portion to increase the gripping characteristics of the jaws.

CHARLES E. O'NEIL.